US012669241B1

(12) United States Patent
Chapman et al.

(10) Patent No.: US 12,669,241 B1
(45) Date of Patent: Jun. 30, 2026

(54) LED LIGHTS FOR DEEP OCEAN USE

(71) Applicant: SeeScan, Inc., San Diego, CA (US)

(72) Inventors: Eric Chapman, Lake Tapps, WA (US); Jon Simmons, Poway, CA (US); Aaron Steiner, San Diego, CA (US); Mark Olsson, La Jolla, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

(21) Appl. No.: 17/701,018

(22) Filed: Mar. 22, 2022

Related U.S. Application Data

(63) Continuation of application No. 14/913,905, filed as application No. PCT/US2014/053748 on Sep. 2, 2014, now Pat. No. 11,320,136.

(60) Provisional application No. 61/872,835, filed on Sep. 2, 2013, provisional application No. 61/872,711, filed on Aug. 31, 2013.

(51) Int. Cl.

| | |
|---|---|
| ***F21V 31/00*** | (2006.01) |
| ***F21V 3/00*** | (2015.01) |
| ***F21V 15/01*** | (2006.01) |
| ***F21V 23/00*** | (2015.01) |
| ***F21V 23/06*** | (2006.01) |
| ***F21V 29/70*** | (2015.01) |
| ***F21Y 115/10*** | (2016.01) |

(52) U.S. Cl.
CPC .............. *F21V 31/005* (2013.01); *F21V 3/00* (2013.01); *F21V 15/01* (2013.01); *F21V 23/006* (2013.01); *F21V 23/06* (2013.01); *F21V 29/70* (2015.01); *F21V 31/00* (2013.01); *F21Y 2115/10* (2016.08)

(58) Field of Classification Search
CPC ........ F21V 31/005; F21V 29/70; F21V 31/00; F21V 3/00
See application file for complete search history.

(56) References Cited

U.S. PATENT DOCUMENTS

| | | | | |
|---|---|---|---|---|
| 4,450,511 A * | 5/1984 | Micha | F21V 31/00 362/267 | |
| 4,996,635 A | 2/1991 | Olsson et al. | | |
| 6,203,173 B1 * | 3/2001 | Duff | F21V 17/20 362/267 | |
| 7,722,216 B2 * | 5/2010 | Amor | B63B 45/02 362/101 | |
| 8,033,677 B1 * | 10/2011 | Olsson | F21V 7/0083 362/267 | |
| 2005/0111222 A1 * | 5/2005 | Olsson | B63B 45/02 362/267 | |

(Continued)

FOREIGN PATENT DOCUMENTS

| | | |
|---|---|---|
| EP | 1460333 A1 | 9/2004 |
| WO | 2012037574 A2 | 3/2012 |

OTHER PUBLICATIONS

Deepsea Power & Light, "Deep Multi SeaLite," Specification, 2002, DeepSea Power & Light, Inc., San Diego, CA.

(Continued)

*Primary Examiner* — Eric T Eide
(74) *Attorney, Agent, or Firm* — Steven C. Tietsworth, Esq.; Michael J. Pennington, Esq.

(57) ABSTRACT

An underwater LED light for use in high ambient pressure environments having a housing, a transparent pressure-bearing window, an MCPCB having one or more LEDS, and a multilayer stack of spacers for carrying loads applied to the window to the MCPCB and to the housing.

19 Claims, 16 Drawing Sheets

(56) References Cited

U.S. PATENT DOCUMENTS

| | | | | |
|---|---|---|---|---|
| 2005/0275725 | A1* | 12/2005 | Olsson | H04N 5/2259 348/E5.026 |
| 2008/0186704 | A1 | 8/2008 | Chou et al. | |
| 2009/0109675 | A1 | 4/2009 | Navarro | |
| 2010/0246195 | A1 | 9/2010 | Muller et al. | |
| 2011/0019416 | A1* | 1/2011 | Poissonnet | F21V 25/12 362/249.02 |
| 2012/0243228 | A1* | 9/2012 | Olsson | F21V 29/70 362/249.02 |

OTHER PUBLICATIONS

Deepsea Power & Light, "Deep Multi SeaLite," User Manual, 2002, DeepSea Power & Light, Inc., San Diego, CA.

International Searching Authority, "Written Opinion of the International Searching Authority" for PCT Patent Application No. PCT/US11/52213, Mar. 17, 2013, European Patent Office, Munich.

International Searching Authority, "Written Opinion of the International Searching Authority" for PCT Patent Application No. PCT/US14/53748, Nov. 25, 2014, European Patent Office, Munich.

* cited by examiner

LED LIGHTS FOR DEEP OCEAN USE

CROSS-REFERENCE TO RELATED APPLICATIONS

This application is a continuation of and claims priority to U.S. Utility patent application Ser. No. 14/139,851, entitled LED LIGHT FIXTURES WITH ENHANCED HEAT DISSIPATION, filed Dec. 23, 2013, which claims priority to U.S. Utility patent application Ser. No. 13/236,561, entitled LED SPHERICAL LIGHT FIXTURES WITH ENHANCED HEAT DISSIPATION, filed Sep. 19, 2011, which claims priority under 35 U.S.C. § 119(e) to U.S. Provisional Patent Application Ser. No. 61/384,128, entitled LED SPHERICAL LIGHT FIXTURES WITH ENHANCED HEAT DISSIPATION, filed Sep. 17, 2010. The content of each of these applications is incorporated by reference herein in its entirety.

FIELD

The present disclosure relates generally to LED light fixtures for use in deep water environments. More specifically, but not exclusively, this disclosure relates to LED light fixtures configured with a substantially or partially spherical housing to provide enhanced heat dissipation.

BACKGROUND

Semiconductor LEDs have largely replaced conventional incandescent, fluorescent and halogen lighting sources in many applications due to their long life, ruggedness, color rendering, efficacy, and compatibility with other solid state devices. In marine applications, for example, light emitting diodes (LEDs) are emerging as a desired light source for their energy efficiency, instant on-off characteristics, color purity, and vibration resistance.

LEDs are an efficient light source widely available, having surpassed High Intensity Discharge (HID) lamps in lumens per watt. Different uses of LEDs in various light applications, including use of LEDs in marine environments, offer unique advantages and disadvantages.

For example, LEDs designed to deliver high levels of brightness suffer from problems associated with heat dissipation and inefficient distribution of light for certain applications. While these high brightness LEDs are significantly more efficient than incandescent systems or gas-filled (halogen or fluorescent) systems, they still dissipate on the order of 50% of their energy in heat. If this heat is not managed, it can induce thermal-runaway conditions within the LED, resulting in their failure. For situations requiring high levels of lighting, this situation is aggravated by combining many high brightness LEDs in a tight geometrical pattern within a light-source structure. Heat management becomes a primary constraint for applications seeking to use the other advantages of high brightness LEDs as a source of illumination.

For example, underwater lighting devices that use LEDs may require configurations that compensate for ambient pressure and/or rising internal temperature in order to avoid catastrophic failure of all or a portion of the lighting device. Such configurations may use a pressure-protected housing to isolate the LEDs from the ambient pressure, or may immerse the LEDs in a fluid-filled temperature compensation environment to provide thermal management.

However, the disadvantages of fluid-filling an LED light may include decreased light beam control and increased contamination of the LED phosphor coating. Thus, protecting LEDs from the external pressure and excess internal temperature using a pressure-protected and thermally-efficient housing is desired.

Accordingly, there is a need in the art to address the above-described and other problems.

SUMMARY

The present disclosure relates generally to LED light fixtures configured with a substantially or partially spherical housing to provide enhanced heat dissipation.

In one aspect, this disclosure relates to a LED light fixture. The LED light fixture may be configured to provide enhanced or improved heat dissipation during operation in deep water environments.

The LED light fixture may include, for example, a housing, which may be made of metal and may include a front and a rear section. The housing may have a hollow interior and an aperture extending through a front side of the housing. A transparent window may extend across the aperture. An LED may be disposed in the housing.

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Overview

Figure 1:
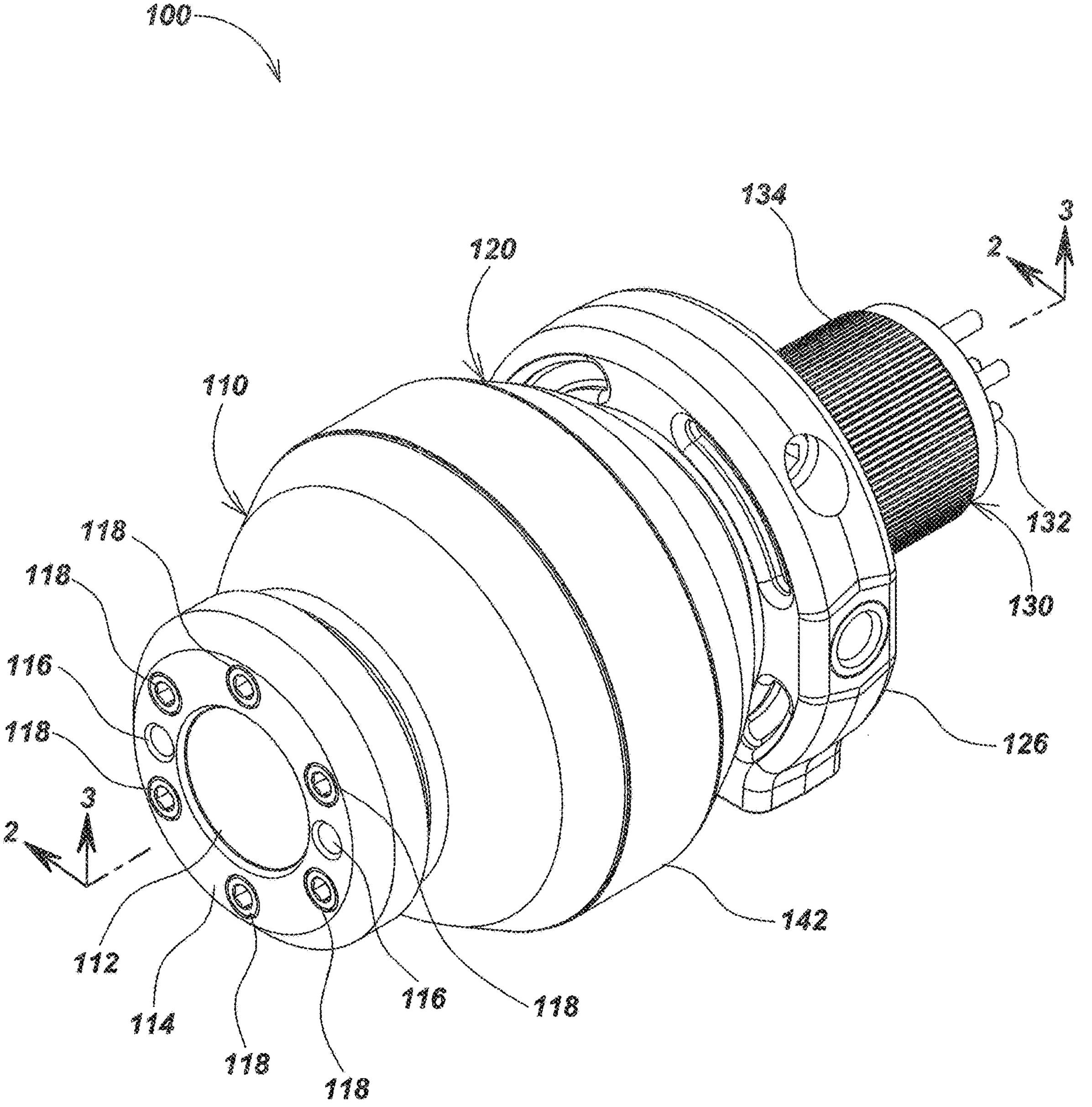
FIG. 1 is an isometric view of an embodiment of an underwater spherical LED light fixture.

The present disclosure relates generally to LED spherical light fixtures. In one aspect, the present disclosure relates to embodiments of an LED spherical light fixture with reduced weight and enhanced heat dissipation.

The LED light fixtures of the present disclosure may be configured for deep submersible applications that require a lightweight assembly and can withstand high pressure environment at significant ocean depths, e.g. 1400 meters and deeper. The LED light fixtures of the present disclosure may conduct the heat generated from an LED driver circuit laterally through a printed circuit board (PCB), a metal outer housing, and then out into the cold surrounding ocean.

Those of skill in the art will appreciate that various thermally-conductive materials may be used for some or all components described herein. Examples of thermally conductive materials include pure metals, metal alloys, plastics, ceramics, and other materials. Materials may also be selected to withstand pressures exerted on the materials by an external environment (e.g., a deep, marine environment), varying temperatures of the external environment, and other conditions imposed on the materials by the external environments.

The LED driver circuitry may or may not be a part of the PCB, as dictated by package design, economics, and heat management. The present disclosure may provide the shortest path from the heat sink of a high intensity LED and associated driver circuit, to the environment surrounding the light fixture, with a minimal number of thermal boundaries in between. This configuration may provide a means to efficiently radiate substantial heat away from the light fixture, and into the cool ocean surrounding the light fixture during operation. Thermal grooves may be formed on the exterior surface of the light fixture body or housing to increase the radiant surface area, thereby enhancing and/or improving heat dissipation.

The present disclosure provides LED light fixtures configured for use at significant ocean depths with reduced weight, by incorporating an efficient pressure-resistant interior volume and reduced wall thickness. With its intrinsic ability to balance external forces, a partially or substantially spherical housing may resist increasing ambient pressure encountered at deep sea depths. With reduced wall thickness, the weight of the light fixture housing may be minimized for a given water displacement, thus significantly reducing the submerged water weight of the LED light fixture. The improved LED light fixtures may provide deep sea vehicle designers the option of mounting the LED light fixtures where they are needed with less concern for weight-and-balance of the undersea vehicle. Less buoyancy is needed to float the undersea vehicle, meaning less weight over the side, smaller vehicle size, fewer trim weights, and less time to prep a dive. The reduced wall thickness of the LED light housing may also improve the thermal management of the LED lights. For example, heat may be transferred from the interior electronics to the cold surrounding environment (e.g., the ocean), increasing the light output potential of the system.

In accordance with the present disclosure, an LED light fixture includes an LED PCB having a rear side and a front side. One of skill in the art will appreciate that the LED PCB in each embodiment may be a metal core PCB (MCPCB) or some other PCB. One or more LEDs may be mounted to the front side of the LED PCB. The LED PCB may be mounted approximately tangential within an aperture formed in a front side of the substantially spherical outer metallic housing. A window made of a transparent material with a high refractive index and thermal conductivity, such as sapphire, may extend across the aperture and may be sealed to the housing. The window may optionally be protected by a window retaining flange (e.g., a plastic flange). Excess heat from the LED PCB may be drawn off by the housing and/or window, and transferred to the surrounding ambient environment (e.g., ocean).

The spherical housing may be constructed using two partially or substantially hemispherical halves that may be assembled using an interior or exterior threaded center coupling element. An LED driver PCB may be suspended by the threaded center coupling element. Excess heat emitted from the LED driver PCB may be drawn off by the threaded center coupling element and transferred to the spherical housing where it may be dissipated into the surrounding environment (e.g., ocean water).

Mounting the LED PCB approximately tangential to the exterior surface of the forward pressure housing may reduce potential degradation of the pressure bearing ability of the substantially spherical shape of the outer housing, while providing ease of electrical connection to the LED driver PCB, and substantial heat sinking of the LED PCB. The use of an aperture with a stepped construction (as shown in several figures) provides several surfaces on the housing to which the LED PCB can transfer thermal energy.

The LED PCB may be mounted at one pole of the forward pressure housing and an electrical interface connector may be mounted at an opposite pole of the aft pressure housing. An LED driver PCB may be attached at the interior equator of the housing—i.e. the plane of maximum cross-section within the spherical outer housing—thereby providing more room for required electronic components. This equatorial attachment may provide a mechanism for cooling by physically decoupling the LED driver PCB heat sinking from the LED PCB heat sinking.

Various additional aspects, details, features, and functions are described below in conjunction with the appended figures.

The following exemplary embodiments are provided for the purpose of illustrating examples of various aspects, details, and functions of apparatus and systems; however, the described embodiments are not intended to be in any way limiting. It will be apparent to one of ordinary skill in the art that various aspects may be implemented in other embodiments within the spirit and scope of the present disclosure.

It is noted that as used herein, the term, “exemplary” means “serving as an example, instance, or illustration.” Any aspect, detail, function, implementation, and/or embodiment described herein as “exemplary” is not necessarily to be construed as preferred or advantageous over other aspects and/or embodiments.

Example Embodiments

Referring to FIG. 1, an embodiment of an underwater LED light fixture 100 in accordance with certain aspects is illustrated. Light fixture 100 may include a pressure housing, which may include one or more components or assemblies, such as a forward pressure housing (or body) 110 and an aft pressure housing (or body) 120. Forward pressure housing

110 may include a light assembly, which may include one or more components, such as a window retaining flange 114, which surrounds and protects a transparent panel, such as window 112, which may be recessed below the level of the window retaining flange 114. The window retaining flange 114 may be constructed of strong materials such as plastics or polymers, to provide high impact strength to deflect foreign object impacts and the like.

Figure 2:
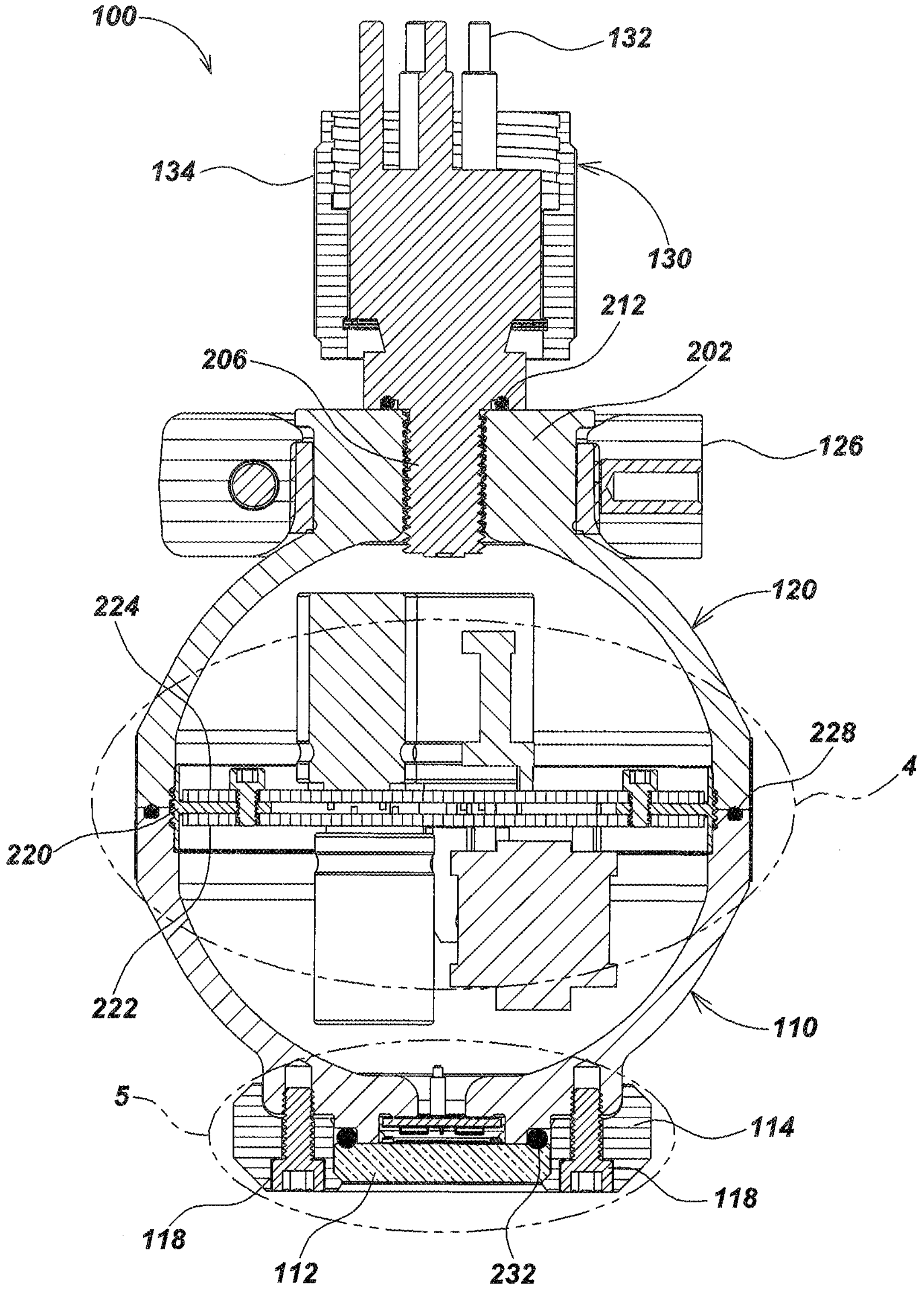
FIG. 2 is a longitudinal section view of the underwater spherical LED light fixture embodiment of FIG. 1, taken along line 2-2.

In a typical embodiment, window 112, which may extend across the aperture and may be sealed to the housing 110, may be made of a suitably high strength transparent material, such as glass, acrylic, sapphire, or other suitable material for providing optical clarity for the passage of light, mechanical strength, such as for example, resistance to external pressure, and heat dissipation. One or more screws, such as a set of six circumferentially spaced machine screws 118, may be used secure the window retaining flange 114 to the forward pressure housing 110. The aft pressure housing 120 may include a cylindrical neck 202 (as shown in FIG. 2), and may be surrounded by a mount 126, which may be used for attaching the light fixture 100 to an underwater structure (not shown). An electrical connector, such as a five-pin underwater electrical connector 130 may be fitted into the neck of the aft pressure housing 120. For example, electrical connector 130 may include a male threaded segment that screws into a female threaded bore or aperture that extends through the cylindrical neck 202. Female threads may be disposed on the surface of the connector 130 and/or on a connector locking sleeve 134 (optional) for preventing accidental de-mating of the underwater connector 130 from a power cable (not shown) during normal operations. The connector 130 may also include one or more conductive contact pins 132 for providing power to the circuit boards inside the light fixture 100. A label, such a tamper-evident label 142, or a cover may be disposed over the seam where the forward pressure housing 110 and the aft pressure housing 120 mate to indicate and/or deter tampering, to provide an additional permeation barrier, and/or to provide an additional mechanical coupling for the forward and aft housings 110 and 120. The cover may include a threaded coupler (not shown) with female threads that couple to male threads on the exterior wall of the housings 110 and 120 (not shown). An alternative cover may attach to one or more of the housings 110 and 120 using fasteners, adhesive, tongue-and-groove, a clamping mechanism, or other feature.

Referring again to FIG. 1, one or more drive pin holes, such as a set of two drive pin holes 116 may be used during assembly for engaging the forward pressure housing 110. The two drive pin holes 116 may pass through the window retaining flange 114 and partially into the forward pressure housing 110. The mount 126 may typically be made of one or more materials, such as a glass-filled plastic. The forward pressure housing 110 and the aft pressure housing 120 may comprise one or more suitable metals, such as anodized aluminum alloy, beryllium copper, stainless steel, titanium, and the like.

Figure 3:
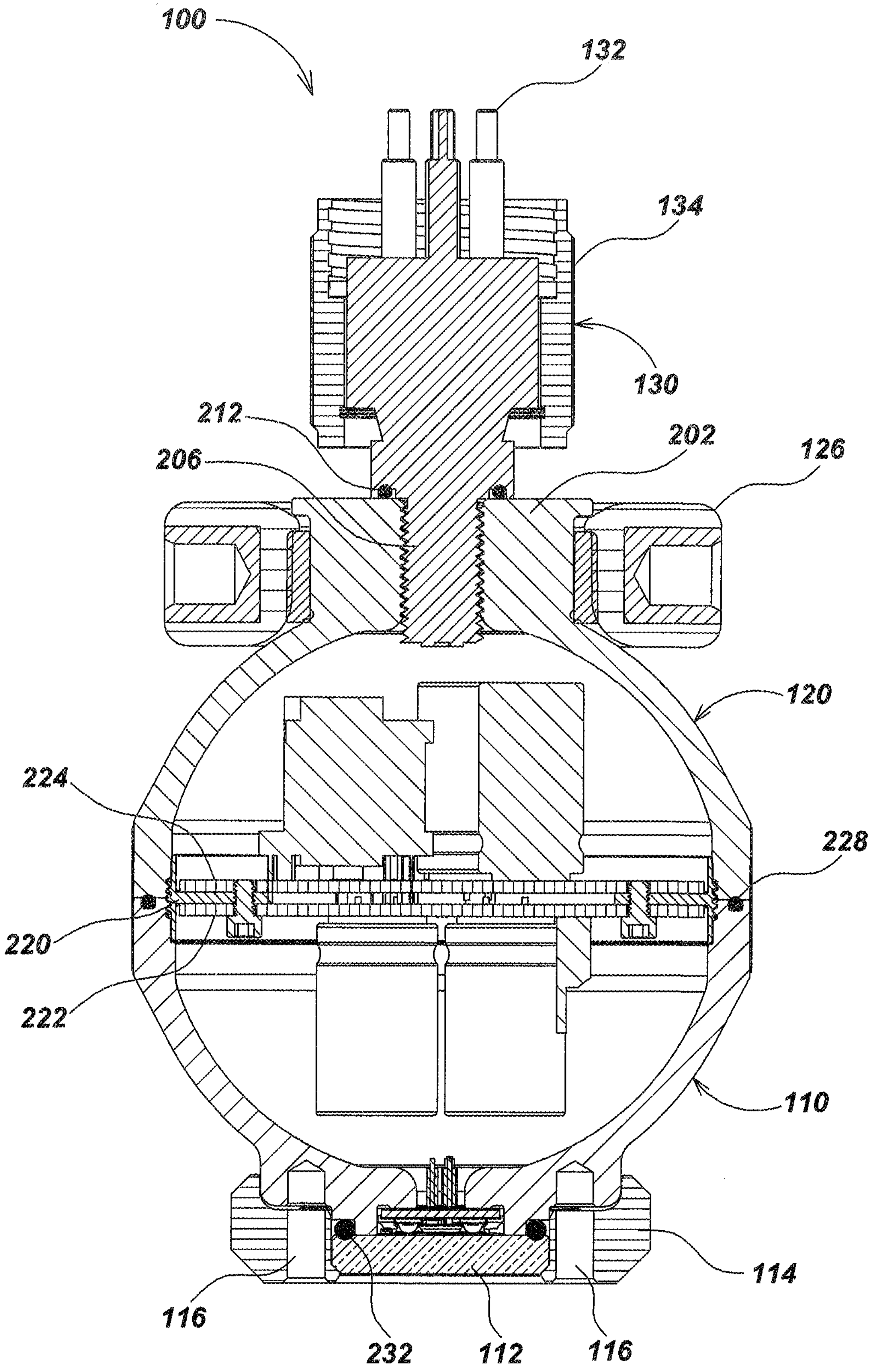
FIG. 3 is a longitudinal section view of the underwater spherical LED light fixture embodiment of FIG. 1, taken along line 3-3.

FIGS. 2 and 3 are section views illustrating additional details of the underwater, generally spherical LED light fixture 100. In an exemplary embodiment, the forward pressure housing 110 and the aft pressure housing 120 may be joined by a coupling element, such as an interior threaded center coupling element 220 to form a generally spherical housing. One of skill in the art will appreciate alternatives to the threaded center coupling element 220, including an exterior threaded coupling element (e.g., a coupling element with female threads that couples to male threads formed on the exterior walls of the housings 110 and 120). One of skill in the art will also appreciate that no center coupling element is needed where male threads are formed on one of the housings 110 and 120 and female threads are formed on the other housings 110 or 120 for coupling the two housings 110 and 120. One of skill in the art will further appreciate non-threaded coupling elements, including clamps, adhesive materials, etc.

The threaded coupling element 220 may be designed using the same or similar materials as the forward pressure housing 110 and the aft pressure housing 120. The material of the coupling element 220 may be selected to provide direct heat transfer from the interior of the spherical housing, to the forward and aft pressure housings 110 and 120, and then to the external environment (e.g., the ocean). In one aspect, the threaded coupling element may be used to suspend one or more PCBs at the equator of the generally spherical housing. For example, a first LED driver PCB 222 may be mounted to the top face of threaded center coupling element 220, and the second LED driver PCB 224 may be mounted to the bottom face of threaded center coupling element 220.

Various elements and sub-assemblies may be configured with the forward pressure housing 110 and aft pressure housing 120, to provide a pressure-resistant and leak-resistant housing having an interior volume that remains dry and at surface air pressure (or some other desired and/or controllable pressure). For example, a sealing element, such as a housing O-ring 228, may be disposed between forward pressure housing 110 and aft pressure housing 120. In an exemplary embodiment, housing O-ring 228 may be seated into the annular groove (not shown) disposed on the forward pressure housing 110, and compressed in assembly between forward pressure housing 110 and aft pressure housing 120 to provide a seal at the interface or seam. A sealing element, such as connector O-ring 212, may be disposed between the connector 130 and the aft pressure housing 120. A sealing element, such as window O-ring 232 may be disposed between the window 112 and a surface of the forward pressure housing 110, and secured by window retaining flange 114. For example, in assembly, the window retaining flange 114 and screws 118 may be configured with the forward pressure housing 110, such that window O-ring 232 is clamped between window 112 and a surface of the forward pressure housing 110, to provide the water-tight seal. In some embodiments, the O-rings may assist in the transfer of thermal heat.

The mount 126 clamps to the exterior of the cylindrical neck 202 of aft pressure housing 120. In an alternate embodiment (not shown), the mount 126 may be configured to alternatively or to also grip an exterior section of the forward pressure housing 110. In yet another embodiment (not shown), the mount 126 may be configured to alternatively or to also grip exterior sections of the forward and aft pressure housings 110 and 120 where those housings 110 and 120 mate. Such an embodiment would provide additional mechanical strength for coupling the housings 110 and 120, and would provide more exterior surface area in contact with the external environment (e.g., the ocean) for transferring thermal energy to that external environment from the interior of the generally spherical housing. Electrical power may be provided to the light fixture through one or more contact pins 132 of the underwater connector 130.

Referring again to FIG. 3, the set of two drive pin holes 116 may extend through the window retaining flange 114 and partially into the forward pressure housing 110 to provide an aperture for engaging and turning the forward pressure housing 110. One of skill in the art will appreciate that other mechanical features of the present invention may be used to turn the forward pressure housing 110.

Figure 4:
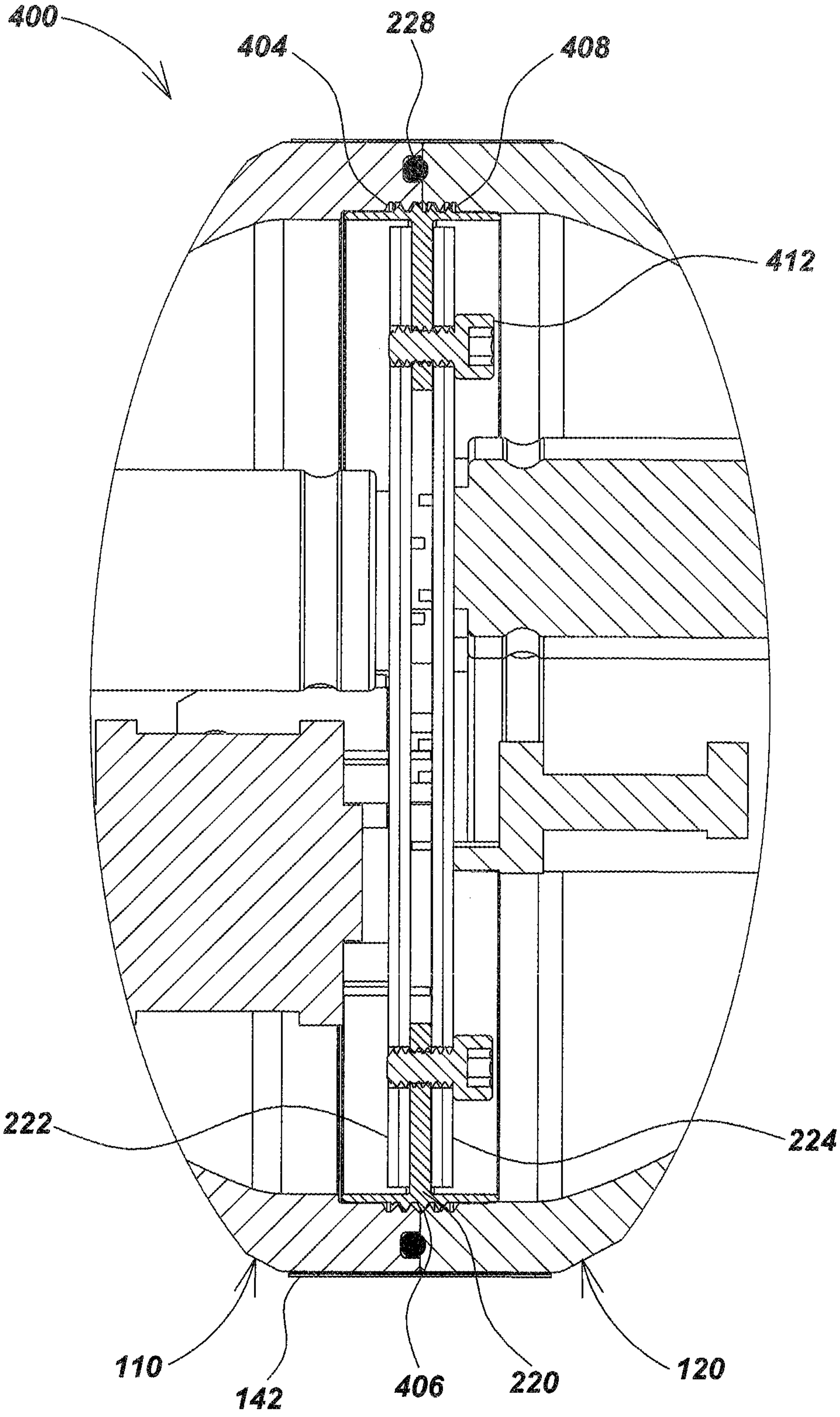
FIG. 4 is an enlarged detail view of an equatorial region of the underwater spherical light fixture embodiment as shown in FIG. 2 and designated as illustrative section 4.

FIG. 4 illustrates additional details of an equatorial region 400 (e.g., region 4 in FIG. 2) of the underwater LED light fixture 100. In an exemplary embodiment, the forward pressure housing 110 and the aft pressure housing 120 may be joined by the threaded center coupling element 220, and sealed by the housing O-ring 228. Male threads 406 formed on the threaded center coupling element 220 may engage female threads 404 on the forward pressure housing 110 and female threads 408 of the aft pressure housing 120, for providing varying degrees of mechanical strength depending on the density and surface area coverage of the threads 404, 406 and 408. The threads 404-408 also direct thermal transfer from the threaded center coupling element 220 to the external environment (e.g., the ocean). The tamper-evident label or impermeable cover 142 is attached (e.g., via adhesion, mechanical fastening, or other means), and covers the seam between the forward pressure housing 110 and the aft pressure housing 120.

First PCB 222 and second PCB 224 may be joined together with one or more screws 412, and mounted into a PCB carrier that may be disposed along the equator of the spherical housing.

Figure 5:
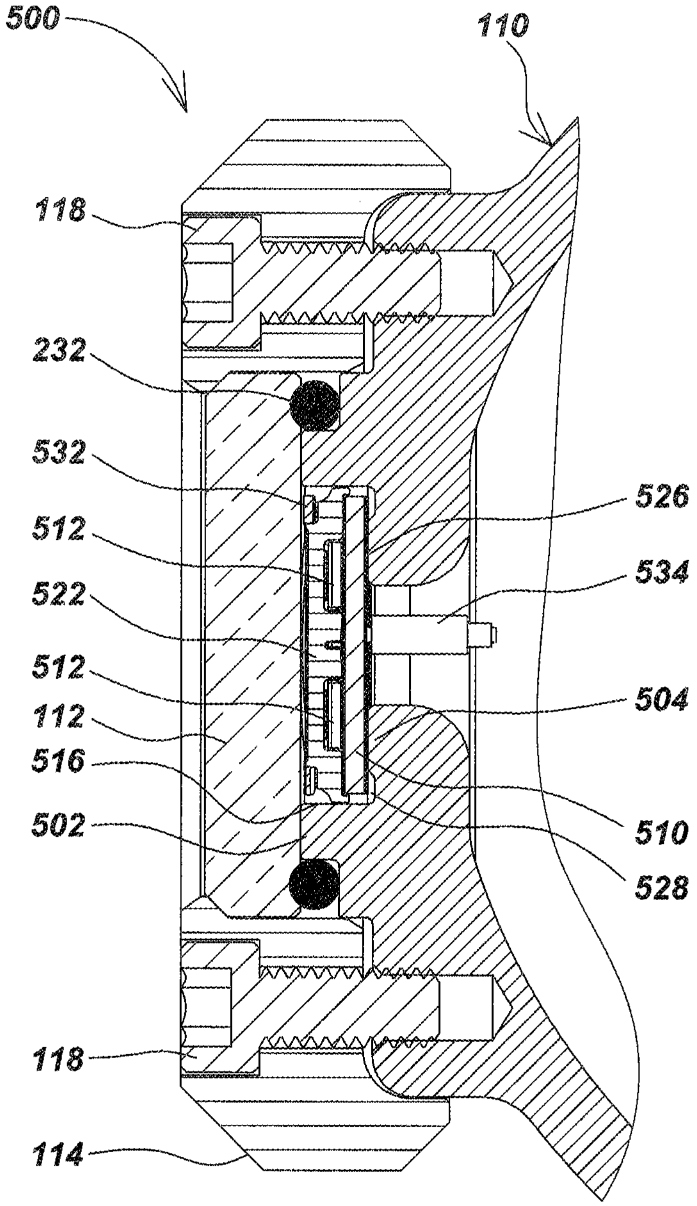
FIG. 5 is an enlarged detail view of an embodiment of a LED light fixture sub-assembly as shown in FIG. 2.

FIG. 5 illustrates additional details of an LED light fixture sub-assembly 500 as shown in FIG. 2. In an exemplary embodiment, a sealing element, such as window O-ring 232 may be disposed between the window 112 and an outer circular section 502 of the forward pressure housing 110, and secured by window retaining flange 114. For example, in assembly, the window retaining flange 114 and screws 118 may be configured with the forward pressure housing 110, such that window O-ring 232 is clamped between window 112 and outer circular section 502 to provide a water-tight seal. One or more high brightness LEDs 512 may be disposed on the outward facing side of an LED PCB, such as LED PCB 510, which may be seated in a stepped aperture or bore 516 formed into the front side of the forward pressure housing 110.

A circular reflector body 522 may be disposed between the window 112 and the LED PCB 510 for redirecting light through window 112. Circular reflector plate 522 may be made of molded plastic, or other similar or equivalent materials. This stack of components, which may include LED PCB 510, LEDs 512, and circular reflector body 522, may be restrained by a circular metallic spring 532 that presses against the inside face of the window 112, transfers thermal energy to the window 112 and the forward housing 110, and clamps the LED PCB 510 to the forward housing 110 for heat transfer.

The LED PCB 510 may be supported by an inner circular section 504 of the forward pressure housing 110. A layer of phase change material (PCM) 526, such as Tmate™. 2900 Series, or other similar or equivalent materials, may be used for providing enhanced thermal coupling to the forward pressure housing 110. An air gap 528 disposed between the LED PCB 510 and the forward pressure housing 110 may provide electrical insulation. The air gap 528 may be configured to provide only an annular air gap around the outer diameter of the LED PCB 510. Electrical power for the LEDs 512 may be provided by one or more spring contacts 534. The stepped configuration of the bore 516 forms a cavity into which the LED PCB and LEDs are inserted, and allows for the aperture through the front side of the forward pressure housing 110 to be minimal in size since only the spring contacts 534 need to pass there through. By minimizing the size of the aperture, a desired level of strength of the generally spherical housing formed by the joined body halves 110 and 120 is achieved.

In alternative embodiments (not shown), the LED PCB may be positioned inside the interior of the housing, where no bore is needed and the aperture is sized with a diameter large enough to allow light from the LEDs to pass through the aperture and the window. In such embodiments, an annular portion of the window may be designed to fit around a corresponding annular portion of the exterior wall of the forward housing (e.g., the portion of the window may match the curvature or flatness of the portion of the forward housing's exterior wall). Annular grooves may be cut into the exterior surface of the forward housing to receive an O-ring for creating a watertight seal between the window and the forward housing.

In one aspect, the central plane of the LED PCB 510 may be positioned and supported in an approximate tangential relationship to the outer diameter (OD) of the forward pressure housing 110. This placement may vary between one and two wall thicknesses (i.e., between two wall surfaces) of the forward pressure housing 110, such that the addition of the window 112 does not affect the inherent pressure resistance of the spherical housing body.

Figure 6:
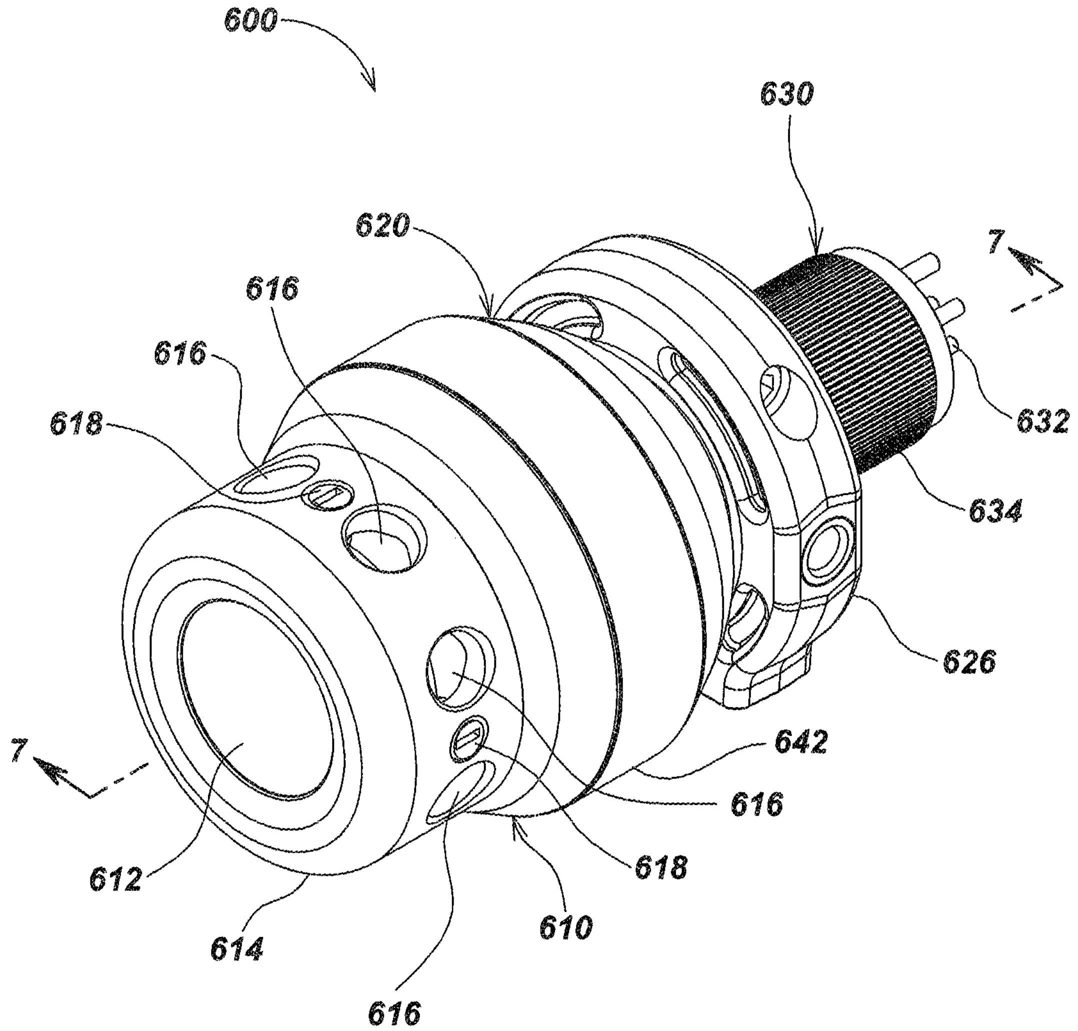
FIG. 6 is an isometric view of an alternate embodiment underwater LED light fixture.

FIG. 6 illustrates an alternate embodiment underwater LED light fixture 600, which may correspond with various aspects of embodiment 600 as shown in FIGS. 1-3. In an exemplary embodiment, LED light fixture 600 is shown to include a forward pressure housing 610, and a window 612 that may be larger in diameter than window 112. FIG. 6 also illustrates a crash guard 614 which may be retained by a plurality of fasteners 618 (e.g., plastic set screws). In accordance with one aspect of FIG. 6, crash guard 614 may include one or more vent holes 616 configured to provide flow through of ambient fluid (e.g., seawater) for enhanced cooling.

An aft pressure housing 620, which may correspond with details of aft pressure housing 120, may be mated to forward pressure housing 610 in a similar fashion to that set forth in the preceding text. A mount bracket 626, which may correspond to mount 126, may be clamped around a portion of the aft housing 620, the forward housing 610 or both. The LED light fixture 600 may receive electrical power from various components, such as a power cable (not shown), and an electrical connector 630 (e.g., a five-pin underwater electrical connector), which may correspond to electrical connector 130. For example, underwater electrical connector 630 may include one or more conductive contact pins 632 and a cylindrical sleeve 634, which may correspond with conductive contact pins 132 and cylindrical sleeve 134. A tamper-evident label or other cover 642, may be used to indicate and/or deter tampering, or to further couple the forward and aft housings 610 and 620.

Figure 7:
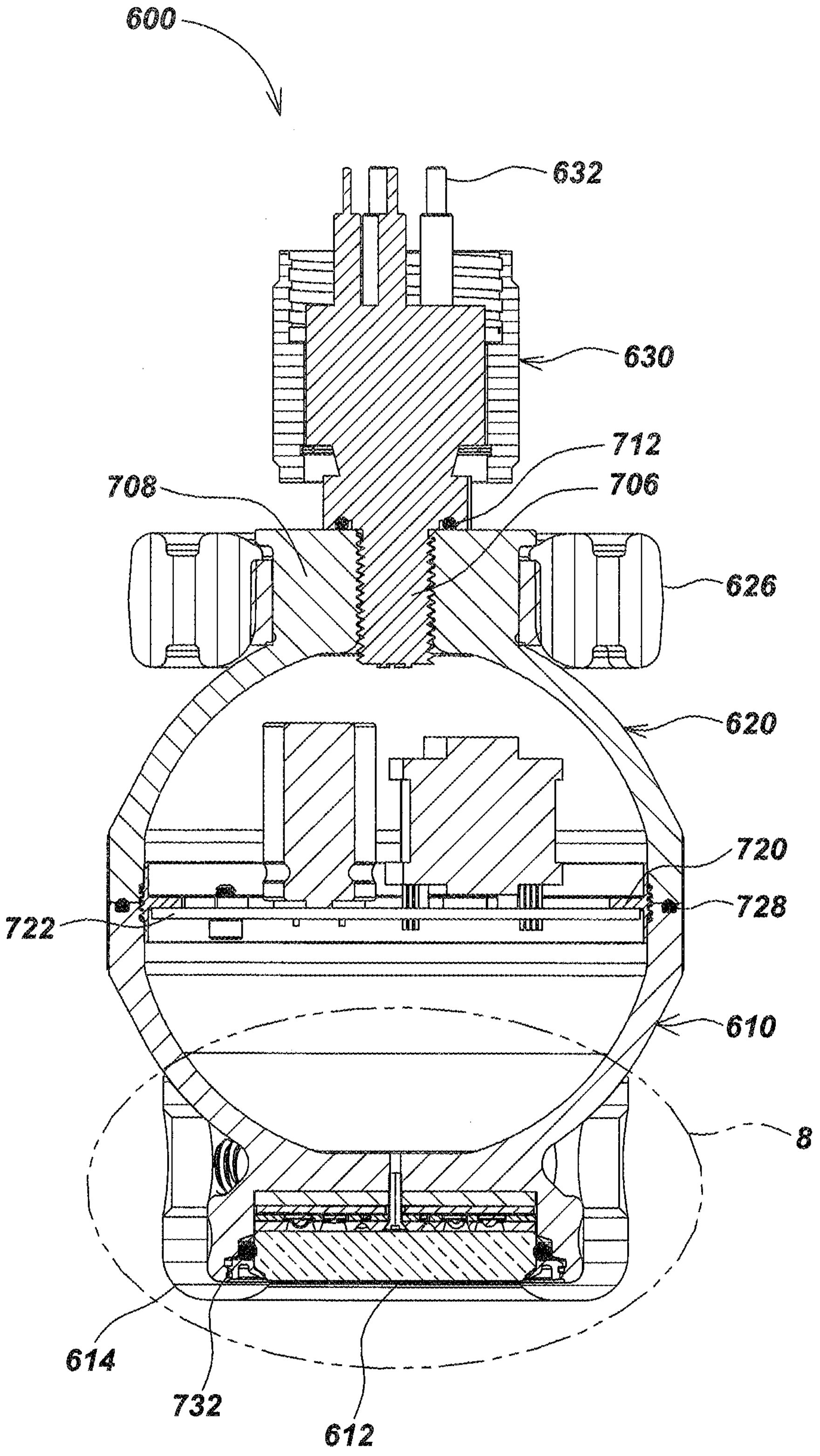
FIG. 7 is a longitudinal sectional side view of the alternate embodiment underwater LED light fixture of FIG. 6, taken along line 7-7.

FIG. 7 illustrates additional details associated with the LED light fixture 600. Details of LED light fixture 600 may correspond with the embodiments described in the preceding examples. For example, forward pressure housing 610 and the aft pressure housing 620 may be joined by a threaded center coupling element 720, which may correspond with threaded center coupling element 220, and sealed with a housing O-ring 728, which may correspond to housing O-ring 228. A window O-ring 732, which may correspond to 232, may be disposed between the window 612 and a surface of the forward pressure housing 610 to provide a water-tight seal. The underwater electrical connector 630 may be sealed to the aft pressure housing 620 by a connector O-ring 712, which may correspond to electrical connector O-ring 212. The mount 626 may clamp around an outer housing of a cylindrical neck 708 which, provides the threaded segment for receiving the threaded length 706 of the underwater electrical connector 630. In an exemplary embodiment, LED light fixture 600 may include, for example, a single mounted LED driver PCB 722.

Figure 8:
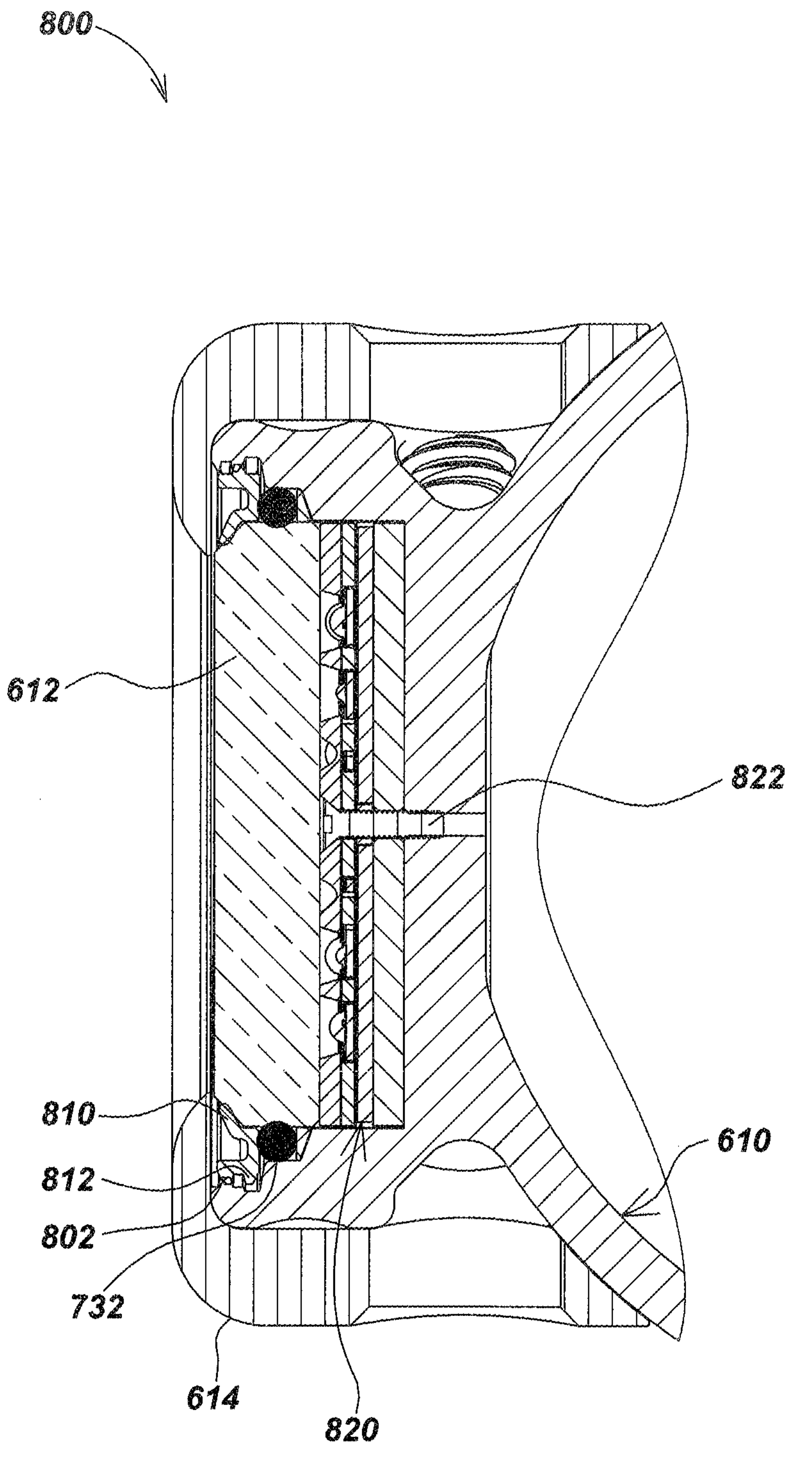
FIG. 8 is an enlarged detail view of an alternate embodiment LED light fixture sub-assembly as shown in FIG. 7.

FIG. 8 is an enlarged section view of the LED light fixture 600 of FIG. 7 illustrating details of an LED light fixture sub-assembly 800. In an exemplary embodiment, a spring collar 810 may capture and press window 612 against a light assembly, such as a stack light assembly 820, which may be stacked and mounted in the forward pressure housing 610 with one or more screws 822. The stack light assembly 820 may be constructed in the manner disclosed in U.S. patent application Ser. No. 12/844,759 of Mark S. Olsson, et al., filed Jul. 27, 2010 entitled SUBMERSIBLE LED LIGHT FIXTURE WITH MULTILAYER STACK FOR PRESSURE TRANSFER, the entire disclosure of which is hereby incorporated by reference. The spring collar 810 may include a series of male threads 812 for engaging a series of female threads 802 disposed on the forward pressure housing 610 for providing compression force. The interior face of a stack light assembly 820 may be positioned approximately tangent to the spherical outer diameter (OD) of the forward pressure housing 610. This placement may vary between one and two wall thicknesses (i.e., between two wall surfaces), as described in connection with FIG. 5.

Window 612 may be sealed to the forward pressure housing 610 by a window O-ring 732. Window 612 may be made of a strong transparent material with a high refractive index and/or thermal conductivity. The window may be made of various materials, including sapphire, acrylic, polycarbonate resin or other similar or equivalent materials for providing optical clarity, high strength to resist external pressure, and for dissipating excess heat into the ambient environment (e.g., cold ocean). The window 612 may be protected from incidental side impact by the crash guard 614. The crash guard 614 may be generally cylindrical, and may be molded of plastic to provide high impact strength for deflecting foreign object impacts.

Figure 9:
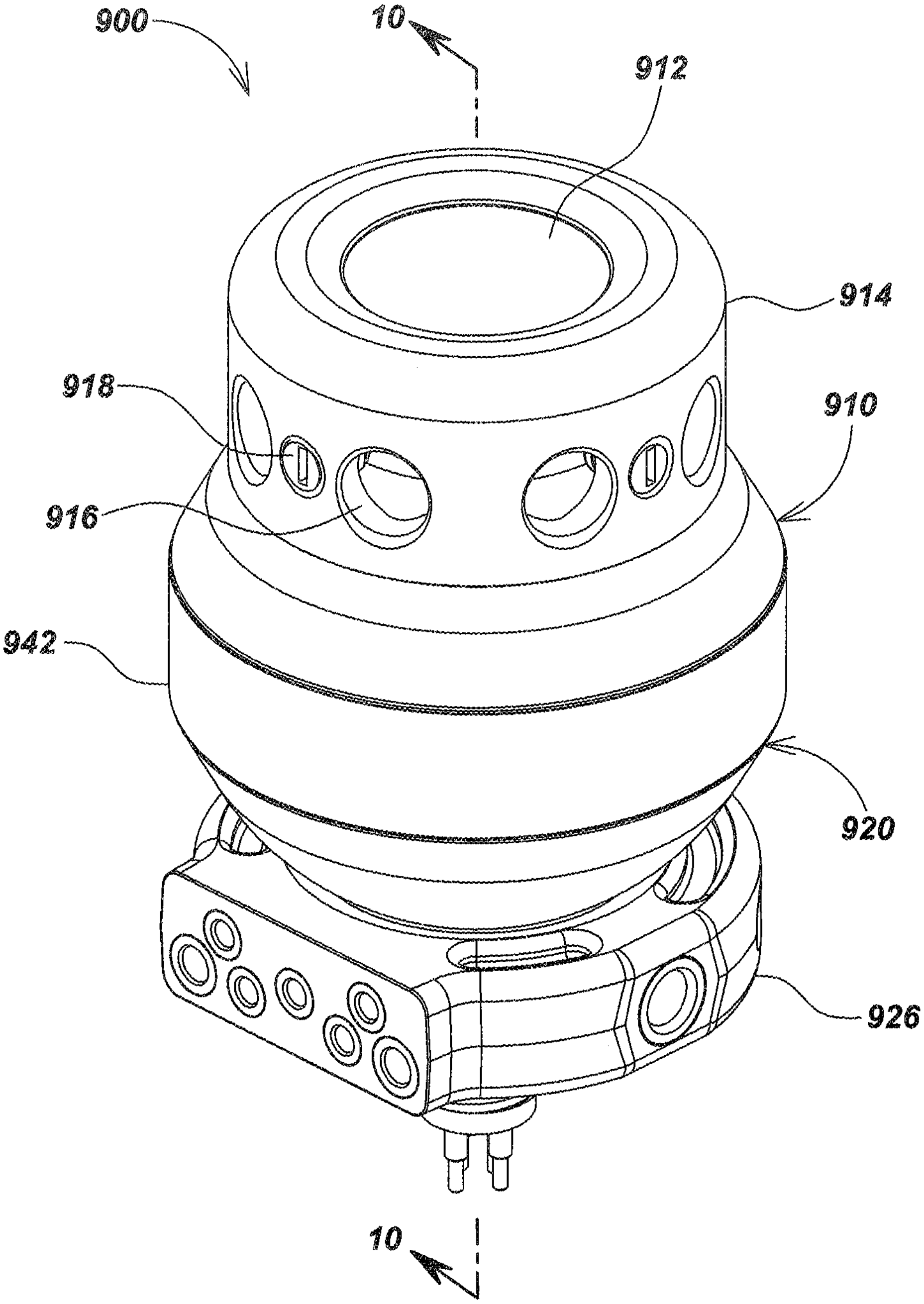
FIG. 9 is an isometric view of an alternate embodiment underwater LED light fixture.

FIG. 9 illustrates an alternate embodiment underwater LED light fixture 900, which may correspond with various aspects of embodiment 100 as shown in FIGS. 1-5, and embodiment 600 as shown in FIGS. 6-8. In an exemplary embodiment, LED light fixture 900 may include a forward pressure housing 910. For example, forward pressure housing 910 may be configured with a window 912, which may made of a suitably high strength transparent material, such as glass, acrylic, sapphire, or other suitable material, as well as a crash guard 914 for retaining the window 912 and other elements, which may be secured by one or more fasteners 918, such as plastic set screws. Crash guard 914 may include one or more vent holes 916 configured to provide flow through of ambient fluid (e.g., seawater) for enhanced cooling.

An aft pressure housing 920 may be mated to forward pressure housing 910 in manners similar to those set forth in the preceding examples. For example, a mount bracket 926 may be clamped around a surface of the aft pressure housing 920. A tamper-evident label or other cover 942 may be used to indicate and/or deter tampering, to provide an impermeable structure at the seam between the forward and aft housings 910 and 920, and/or provide an additional or alternative mechanical coupling for the forward and aft housings 910 and 920.

Figure 10:
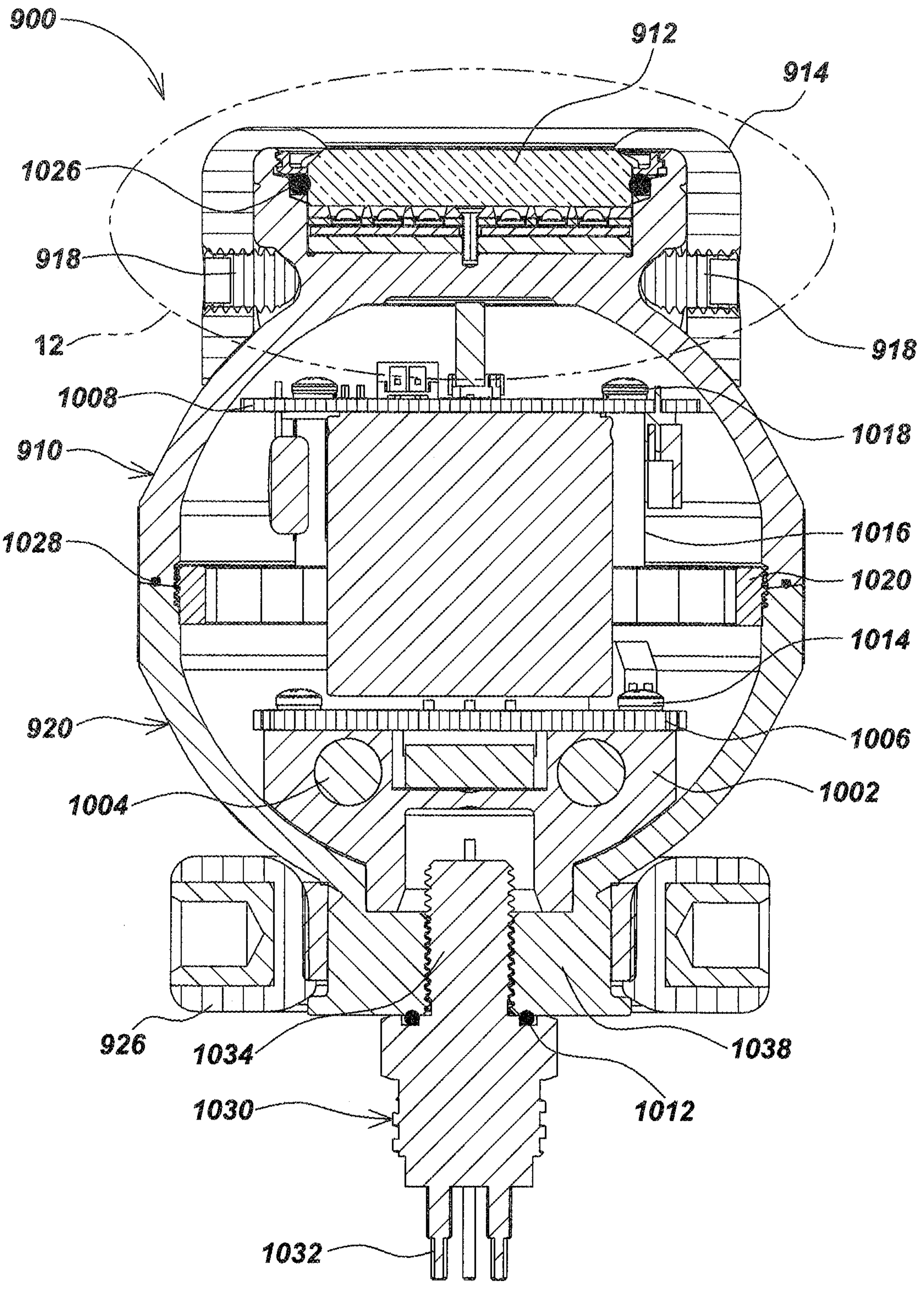
FIG. 10 is a vertical section view of the alternate embodiment LED light fixture of FIG. 9, taken along line 10-10.
Figure 11:
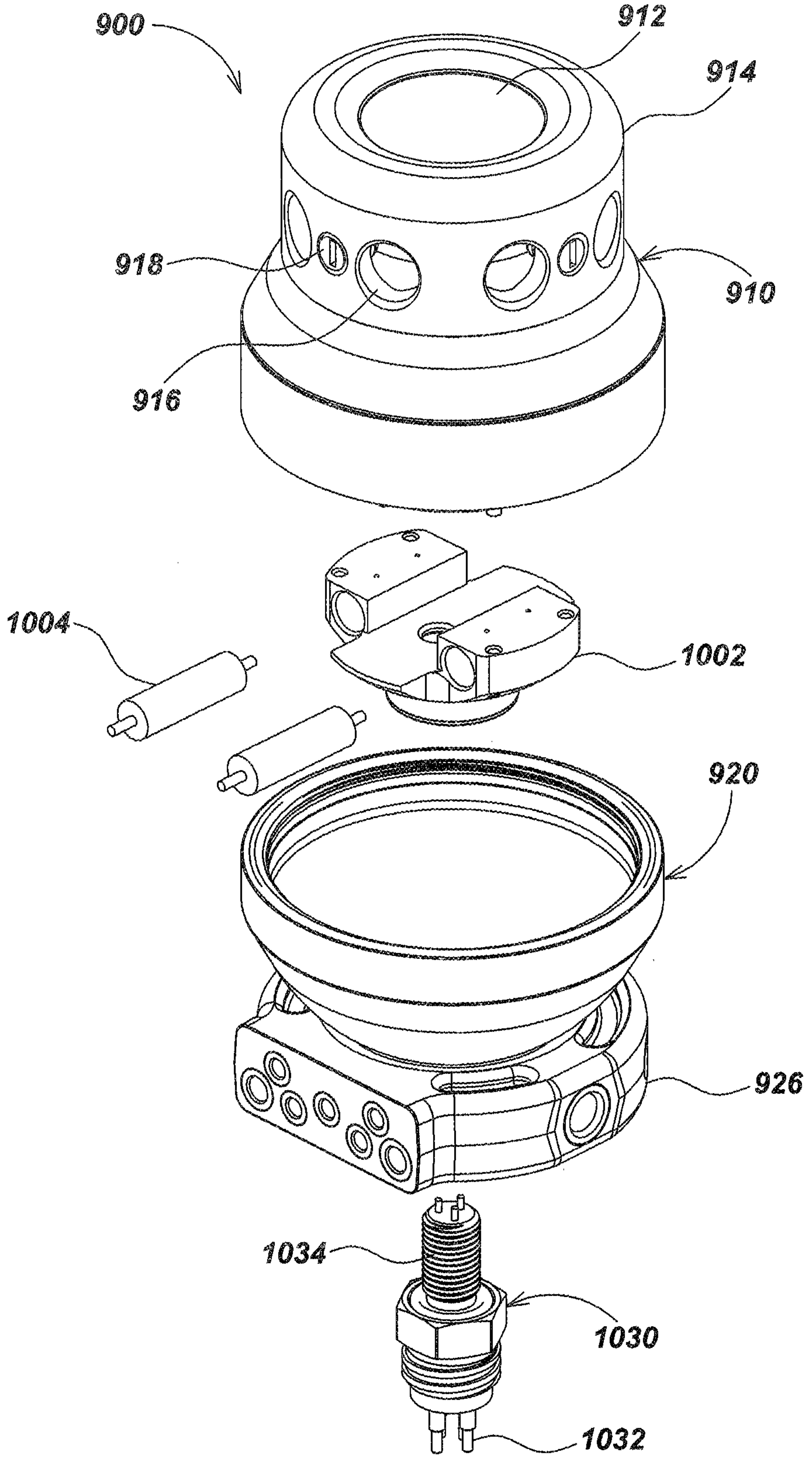
FIG. 11 is an exploded isometric view of details of the alternate embodiment LED light fixture as shown in FIG. 9.

FIGS. 10 and 11 illustrate additional details of the LED light fixture 900. Details of LED light fixture 900 may correspond with the embodiments described in the preceding examples. For example, forward pressure housing 910 and the aft pressure housing 920 may be joined by a threaded center coupling element 1020 and sealed with a housing O-ring 1028. A window O-ring 1026 may be disposed between window 912 and a surface of the forward pressure housing 910 to provide a water-tight seal.

An underwater electrical connector 1030, such as a three-pin underwater electrical connector may be sealed to the aft pressure housing 920 by a connector O-ring 1012.

In an exemplary embodiment, one or more PCBs, such as a lower LED PCB driver 1006, and an upper LED PCB driver 1008, may be disposed in the interior of the LED light fixture 900. Lower LED PCB driver 1006 may be disposed in the aft pressure housing, and mounted to a surface of a thermally-conductive plug 1002 (which may be press fit inside the aft housing 920), with one or more screws 1014, which may thermally connect various elements to the generally spherical housing to dissipate heat from the interior of the LED light fixture 900 and away from other heat producing elements in the forward section, such as an LED MCPCB or a stack light assembly (e.g., assembly 1220 in FIG. 12). One or more wire wound resistor cores 1004 may be disposed inside one or more holes formed into the thermally-conductive plug 1002, as shown in FIG. 11. Thermally-conductive plug 1002 may, for example, be made of metal, such as an aluminum alloy, or other equivalent material. An alternate heat sinking path may be provided through the thermally conductive plug 1002, allowing heat to transport out from the LED PCB driver 1006 to the aft housing 920. Thermally-conductive grease (not shown) may be used to enhance any thermal path to the aft housing 920 (e.g., grease in association with the wound resistor cores 1004).

The threaded length 1034 of electrical connector 1030 may be screwed into cylindrical neck 1038 of aft pressure housing 920. Thermally-conductive plug 1002 and forward pressure housing 910 may be coupled or press fit. A thermally-conductive material may be disposed between the inner surface of the lower body 920 and the outer surface of the thermally-conductive plug 1002 for enhancing thermal coupling.

Upper LED PCB driver 1008 may be disposed in the forward pressure housing 910 and mounted into one or more spacers 1016 with one or more fasteners (e.g., one or more screws), which may be disposed in forward pressure housing 910. The spacers 1016 also couple to the coupling element 1020. Various elements may be disposed on upper LED PCB driver 1008. Such elements may include a MOSFET, a capacitor and a resistor. To optimize the thermal efficiency of the generally spherical housing, a separate thermal path from each or combined heat producers in the interior of the LED light fixture 900 may be provided.

Figure 13:
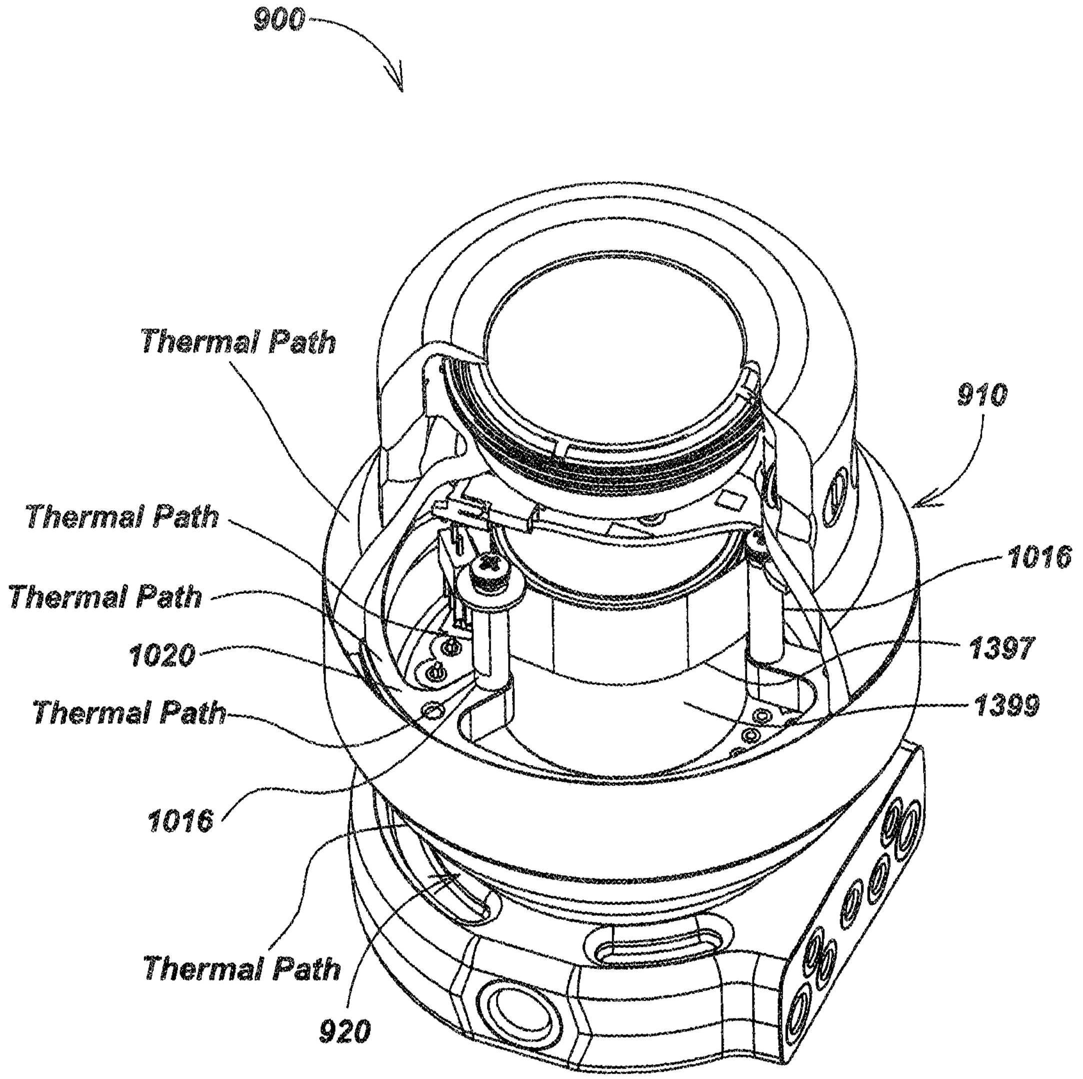
FIG. 13 is a three-dimensional view of an alternate embodiment LED light fixture sub-assembly as shown in FIG. 10.

A copper alloy strap may be attached to the spacers 1016 for conducting heat from the LED PCB driver 1008 or other components in the lighting fixture to the coupling element 1020 and housings. FIG. 10 also illustrates an internal capacitor (at center, between the two PCBs 1006 and 1008) and mounted on the PCB 1008. Thermal energy may be drawn from the capacitor to the copper alloy straps on the spacers 1016. FIG. 13 illustrates details of such a thermal pathway consisting of a flexed thermally conductive metal strap 1397 in direct thermal contact with a capacitor 1399 (or another circuit element) and one or more spacers 1016, which couple thermal energy to the threaded center coupling element 1020 and out into the surrounding environment through the forward pressure housing 910 and aft pressure housing 920. The capacitor 1399 may be an electrolytic type packaged in an aluminum housing covered by a plastic wrap. Typically, it heats up under normal use. By using the alloy strap 1397 to conduct some of that heat away from the capacitor 1399, an increase in the mean time before failure of the capacitor 1399 may be achieved.

Figure 12:
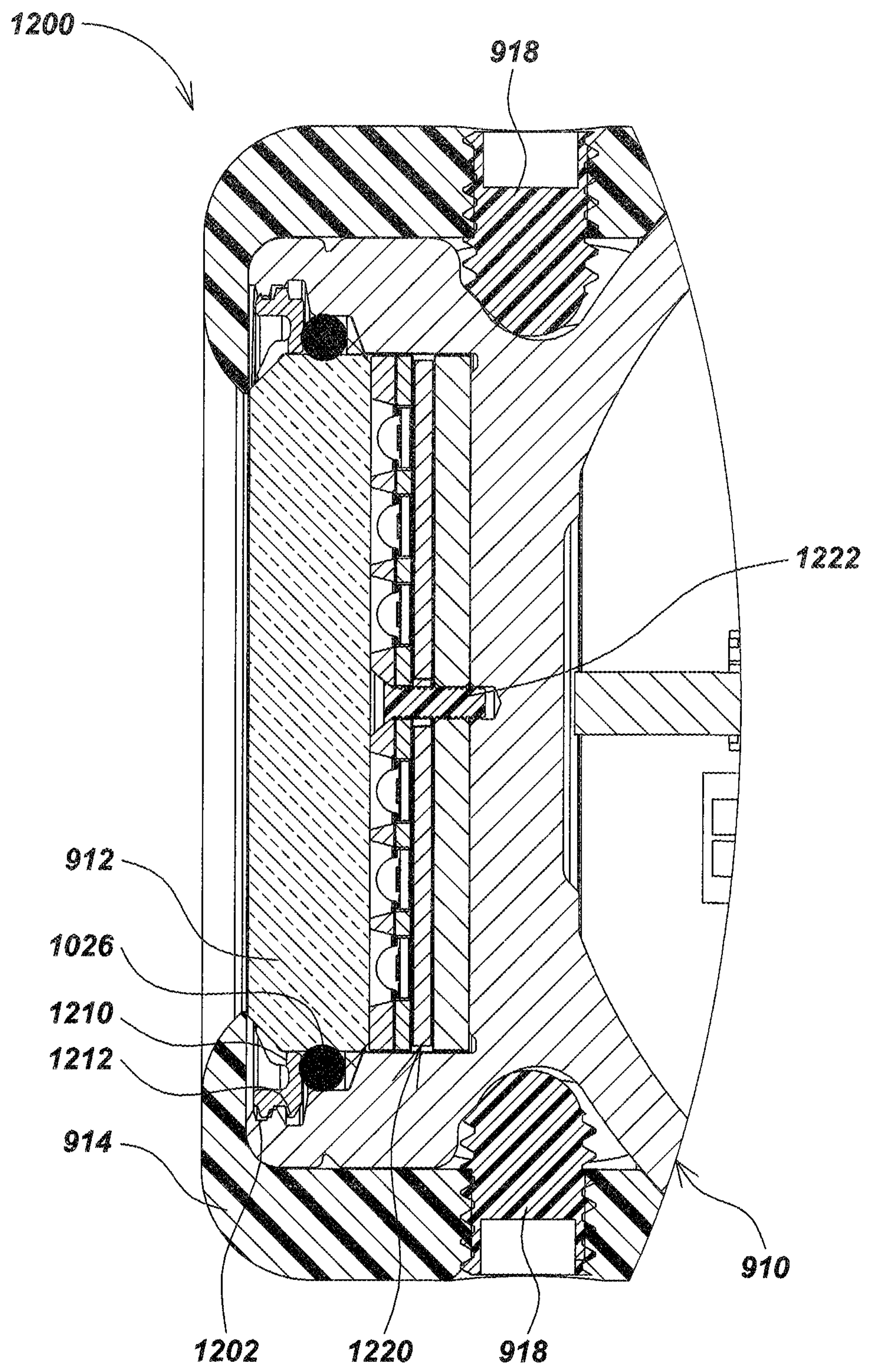
FIG. 12 is an enlarged detail view of an alternate embodiment LED light fixture sub-assembly as shown in FIG. 10.

FIG. 12 is an enlarged section view of an LED light fixture sub-assembly 1200, which may correspond with details of LED light fixture 900 as shown in FIG. 9. For example, a spring collar 1210 may capture and press window 912 against a light assembly, such as a stack light assembly 1220, which may be stacked and mounted in the forward pressure housing 910 with one or more fasteners 1222. The stack light assembly 1220 may be constructed in the manner disclosed in U.S. patent application Ser. No. 12/844,759 of Mark S. Olsson, et al., filed Jul. 27, 2010 entitled SUBMERSIBLE LED LIGHT FIXTURE WITH MULTILAYER STACK FOR PRESSURE TRANSFER, the entire disclosure of which is hereby incorporated by reference. The spring collar 1210 may include a series of male threads 1212 for engaging a series of female threads 1202 disposed on the forward pressure housing 910 for providing compression force and thermal transfer. The interior face of a stack light assembly 1220 may be positioned approximately tangential to the spherical outer diameter (OD) of the forward pressure housing 610.

A generally spherical housing may refer to a substantially spherical housing, wherein at least ninety percent of the housing's exterior surface(s) is/(are) spherical (e.g., allowing for some non-spherical elements), a partially spherical housing, wherein less than ninety percent, but greater than fifty percent of the housing's exterior surface(s) is/(are) spherical, or any other proportionally-spherical housing.

The stacking of elements behind the window may be accomplished externally from the housing (e.g., into the bore using an exterior loading approach) or internally within the housing (e.g., insertion behind the window from the rear opening of the forward housing/body).

Figure 14:
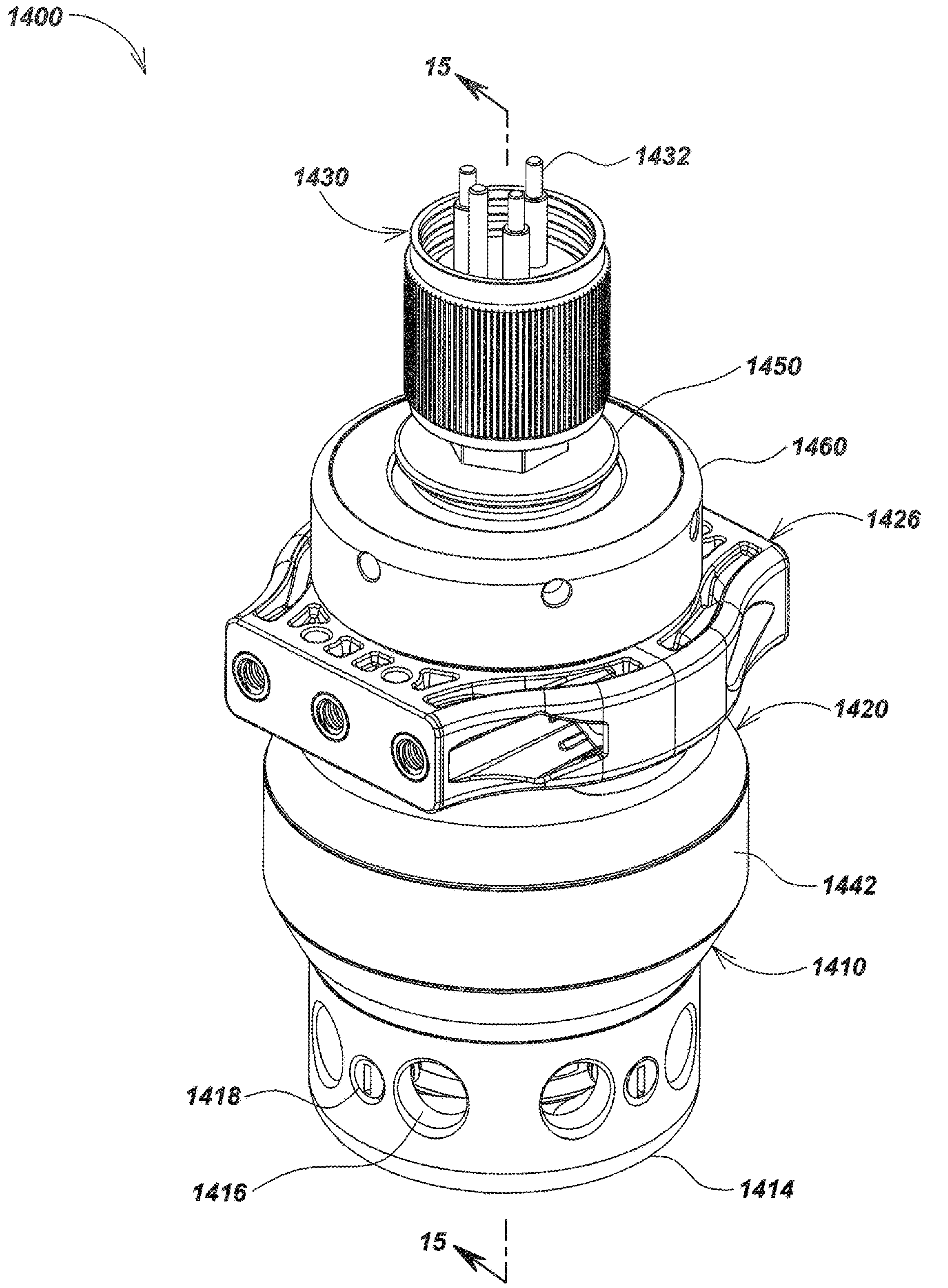
FIG. 14 is an isometric view of an alternate embodiment underwater LED light fixture.

FIG. 14 illustrates an alternate embodiment of a deep ocean underwater LED light fixture 1400 including such a sealed servicing volume. The underwater light fixture embodiment 1400 may correspond with various aspects of embodiment 100 as shown in FIGS. 1-5, embodiment 600 as shown in FIGS. 6-8, and embodiment 900 as shown in FIGS. 9-13, with addition of further aspects as described subsequently and shown in FIG. 14 through FIG. 16.

In an exemplary embodiment, LED light fixture 1400 may include a forward pressure housing element 1410 for withstanding deep ocean pressure. For example, forward pressure housing 1410 may include a window, such as the window 1512 illustrated in FIG. 15, which may comprise a suitably high strength transparent material, such as glass, acrylic, sapphire, or other suitable material(s), as well as a crash guard 1414 for protecting the window and other elements, which may be secured by one or more fasteners 1418, such as plastic set screws or other attachment mechanisms. Crash guard 1414 may include one or more vent holes 1416 for providing a flow of ambient fluid (e.g., seawater) for enhanced cooling through heat exchange between the housing and fluid.

An aft pressure housing element 1420, also for withstanding deep ocean pressure, may be mated to forward pressure housing element 1410, such as in a manner the same as or similar to those described previously herein. For example, a mount bracket 1426 may be clamped around a surface of the aft pressure housing 1420. A tamper-evident label or other cover 1442 may be used to indicate and/or deter tampering, to provide a fluid impermeable structure at the seam between the forward and aft housings 1410 and 1420, and/or providing an additional or alternative mechanical coupling for the forward and aft housings 1410 and 1420.

In addition to, or alternately from the previous embodiments illustrated herein, the aft pressure housing 1420 may further be formed with a rear portion and forward portion having a portion of a second, reduced diameter, at the rear portion or between the rear and forward poliions. A mounting bracket 1426 may mount about the portion of reduced diameter on the aft pressure housing 1420. The rear portion of the aft pressure housing 1420 may further be dimensioned to permit housing of various components comprising the aforementioned sealed servicing volume. Embodiments of the various sealed servicing volume components are described in greater detail subsequently herein.

An aft housing cap 1450 may seat onto the rear portion of the aft housing 1420. A housing cap retainer 1460 may be seated about the aft housing cap 1450 and mate to threads formed on the rear of the aft housing 1420 securing the aft housing cap 1450 and the rear of the aft housing 1420 together. O-rings 1552 and 1554 (FIG. 15) may seat between the aft housing cap 1450 and aft housing 1420, thereby providing a water-tight seal to components contained within the interior volume of the LED light fixture 1400 formed by the rear portion of the aft housing 1410 and the housing cap retainer 1450, also referred to herein as the sealed servicing volume or user-serviceable volume.

Figure 15:
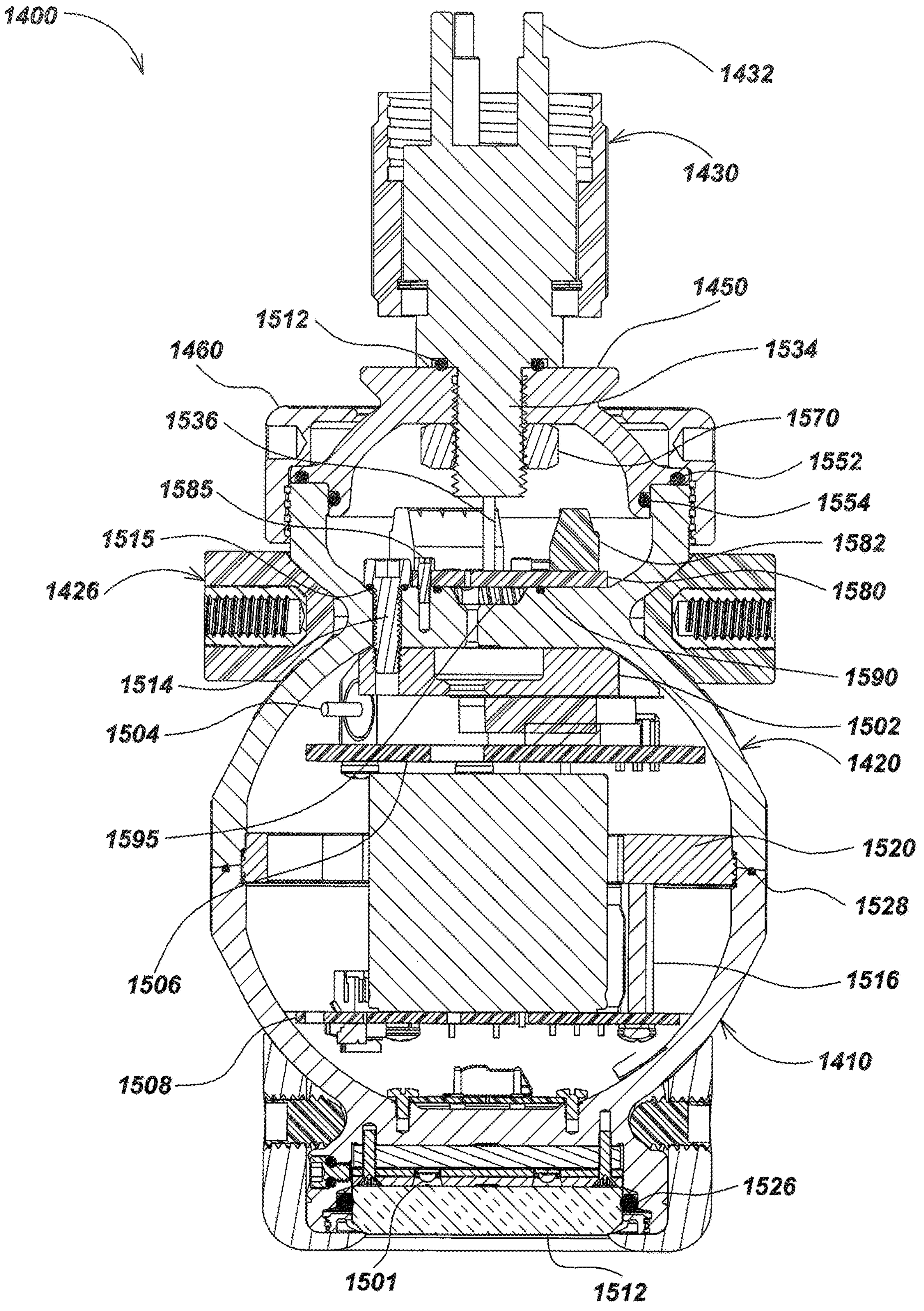
FIG. 15 is a vertical section view of the alternate embodiment LED light fixture of FIG. 14, taken along line 15-15.

An underwater electrical connector 1430, such as a three-pin underwater electrical connector, may be sealed to the aft housing cap 1450 by a connector O-ring 1512 (FIG. 15). The connector 1430 may also include one or more conductive contact pins 1432 for purposes of transmitting electrical power and/or signal to the LED lighting fixture 1400 when coupled to a power source (not illustrated). A threaded length 1534 (FIG. 15) of electrical connector 1430 may be made to pass through an opening formed centrally on the aft housing cap 1450 and secure thereto via nut 1570 (FIG. 15).

Figure 16:
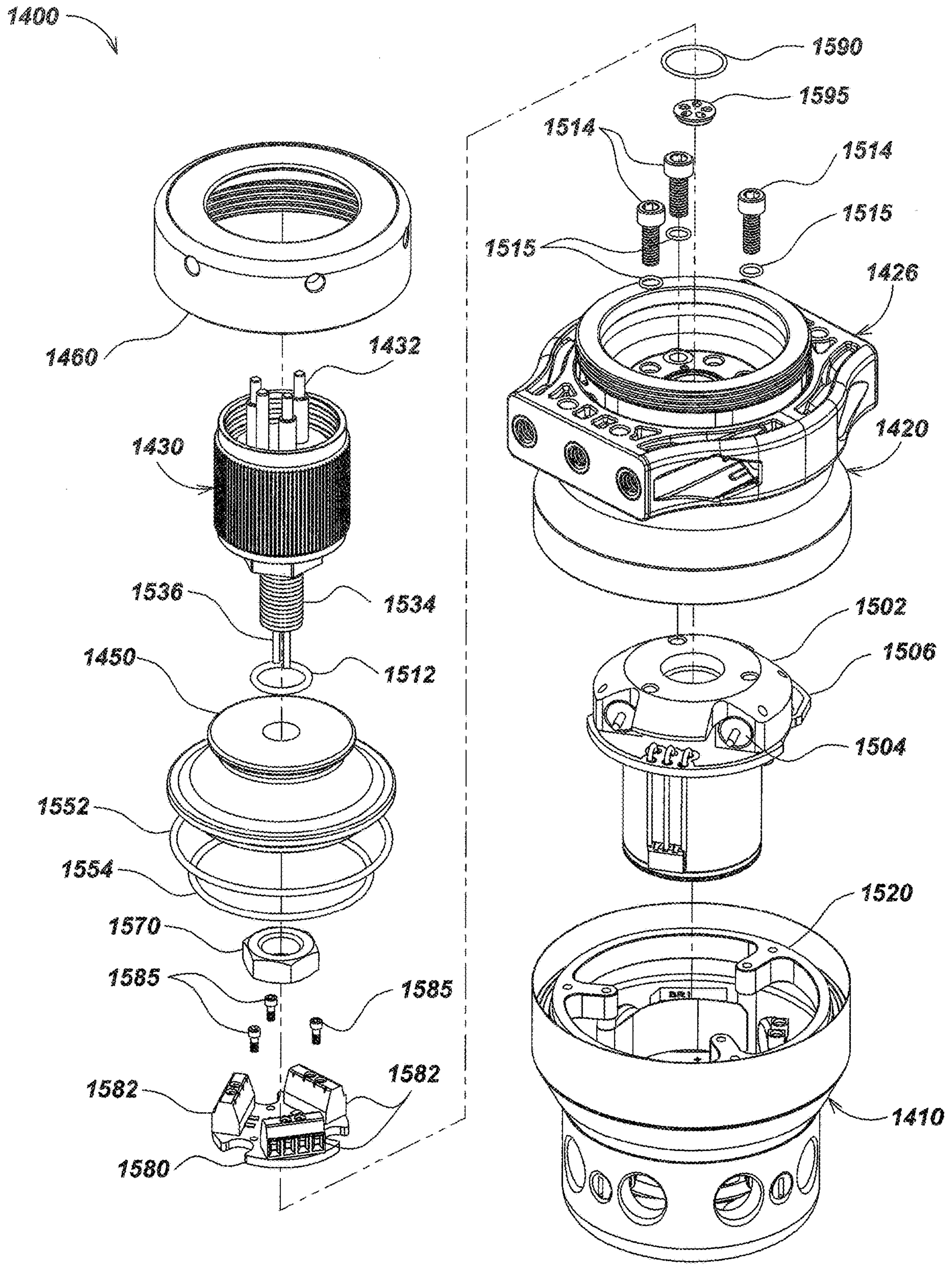
FIG. 16 is a partially exploded isometric view of details of the alternate embodiment LED light fixture as shown in FIG. 14.

Turning to FIGS. 15 and 16, the sealed servicing volume within the rear portion of the aft housing 1410 and the housing cap retainer 1450 may contain various additional sealed servicing volume components. For instance, the rear portion of the aft housing 1420 may further accommodate a serviceable interconnect PCB 1580. The interconnect PCB 1580 may seat within these rear portion formed on the aft housing 1420 and secure thereto via a series of small screws 1585.

The interconnect PCB 1580 may permit electrical power and/or signal to pass to components contained within the forward and aft housings 1410 and 1420 while, in conjunction with an O-ring 1590, provide a water-tight seal thereto. An interconnect PCB support piece 1595 may seat centrally below the interconnect PCB 1580 in an opening between the rear and forward portions of the aft housing 1420 so as to support interconnect PCB 1580, which may fullher aid in enhancing and/or making the seal to the volume contained within the front and aft housing 1410 and 1420 pressure tolerant.

The interconnect PCB 1580, the O-ring 1590, and/or the interconnect PCB support piece 1595 within the rear portion of the aft housing 1420 may form a backup or secondary barrier, preventing water ingress to the components stored within the front housing 1410 and aft housing 1420 by providing an internal seal. Wiring in a wiring section (not illustrated) may further pass through the interconnect PCB support piece 1595 connecting the interconnect PCB 1580 and a lower LED PCB driver 1506 situated within the front and aft housing 1410 and 1420.

In assembly, the forward pressure housing 1410 and the aft pressure housing 1420 may be joined by a threaded center coupling element 1520 and sealed with a housing O-ring 1528. A window O-ring 1526 may be disposed between a window 1512 and a surface of the forward pressure housing 1410 to provide a water-tight seal.

In an exemplary embodiment, one or more PCBs, such as the lower LED PCB driver 1506 and an upper LED PCB driver 1508, may be disposed in the interior volume of the LED light fixture 1400 formed by the front and aft housing 1410 and 1420. Lower LED PCB driver 1506 may be disposed in the aft pressure housing 1420, and mounted to a surface of a thermally-conductive plug 1502 (which may be attached inside the aft housing 1420), with one or more screws, which may thermally connect various elements to the housing. The housing may be generally spherical in an exemplary embodiment, as shown, to dissipate heat from the interior of the LED light fixture 1400 and away from other heat producing elements in the forward section, such as a LED MCPCB or a stack light assembly 1501, which may be of the same design and function to assembly 1220 of FIG. 12. The thermally-conductive plug 1502 may further secure to the aft housing 1420 via screws 1514 sealed with O-rings 1515. Some embodiments may include housings having alternate shapes or combinations of shapes.

One or more wire wound resistor cores 1504 may be disposed inside one or more holes formed into the thermally-conductive plug 1502. Thermally-conductive plug 1502 may, for example, comprise metal(s), such as an aluminum alloy, or other equivalent materials. An alternate heat sinking path may be provided through the thermally conductive plug 1502, allowing heat to transport out from the LED PCB driver 1506 to the aft housing 1420. Thermally-conductive grease (not shown) may be used to enhance any thermal path to the aft housing 1420 (e.g., grease in association with the wound resistor cores 1504). A thermally-conductive material (not illustrated) may be disposed between the inner surface of the aft housing 1420 and the outer surface of the thermally-conductive plug 1502 for enhancing thermal coupling.

Upper LED PCB driver 1508 may be disposed in the forward pressure housing 1410 and mounted into one or more spacers 1516 with one or more fasteners (e.g., one or more screws), which may be disposed in forward pressure housing 1410. The spacers 1516 may also couple to the coupling element 1520. Various elements may be disposed on upper LED PCB driver 1508. Such elements may include, for example, a MOSFET, a capacitor and a resistor. To optimize the thermal efficiency of the housing, a separate thermal path from each or combined heat producers in the interior of the LED light fixture 1400 may be provided.

Wiring 1536 from the electrical connector 1430 may secure to wiring mounts 1582 on the interconnect PCB 1580 for purposes of transmitting electrical power and/or signals. Additional wiring (not illustrated for clarity) may extend from below the interconnect PCB 1580 and pass through holes formed on the interconnect PCB support piece 1595 and connect to the lower LED PCB driver 1506. An external power source connected to the electrical connector 1430 may thereby transmit electrical power and/or signal to the interconnect PCB 1580, further connected to the lower LED PCB driver 1506, the upper LED PCB driver 1508, and ultimately the stack light assembly 1501.

The electrical connector may be configured to be readily serviceable by a user such as shown in this exemplary embodiment. For example, in servicing/replacing of electrical connector 1430 on the LED light fixture 1400, the housing cap retainer 1460 may be removed from the aft housing 1420 by unscrewing the housing cap retainer 1460 from the threads on the aft housing 1420. This may be accomplished without the use of any specialized tools to aid is serviceability. For example, a user may unscrew the housing cap retainer 1460 by hand or through the use of a widely available tool such as a spanner wrench or other standard tool, such as a screwdriver or other driver-type tool.

The aft housing cap 1450 may then be unseated from the rear of the aft housing 1420, exposing wiring 1536 connected to wiring mounts 1582 on interconnect PCB 1580. The wiring 1536 may then be disconnected from the wiring mounts 1582. The nut 1570 may be removed from the threaded length 1534 of electrical connector 1430, thereby permitting the electrical connector 1430 to be separated from the aft housing cap 1450. FIG. 16 illustrates additional details of the light embodiment 1400 in exploded view.

The electrical connector may then be serviced or replaced by another similar electrical connector or a variety of other electrical connector types which may include, for example, electrical connectors with a different threaded stud size, connector size or shaping, number of connectors, or other properties.

In implementations where other electrical connector types are used, the LED light fixture embodiment 1400 may be configured to accommodate different wiring schemes or connections. For example, multiple wiring mounts 1582 may be secured to the interconnect PCB 1430 despite not requiring all wiring mounts 1582 with the use of electrical connector 1430. Additional wiring mounts 1582, as well as other internal electronics and electrical pathways, may be used to connect other electrical connector types for a variety of different uses and applications.

While various embodiments of the present underwater LED spherical light fixture have been described in detail, it will be apparent to those skilled in the art that the present invention can be embodied in various other forms not specifically described herein. Therefore the protection afforded the present invention should only be limited in accordance with the following claims and their equivalents.

The invention claimed is:

1. A submersible light, comprising:

a housing for withstanding deep ocean pressure comprising metal and having a forward side and an aft side, the housing further having a hollow interior enclosing a first volume and a first aperture extending through the forward side of the housing, wherein the housing comprises thermally coupled forward and aft sections, wherein heat from an LED driver circuit is conducted through a coupling element into the aft section, while heat from an LED PCB is conducted into the forward section independently of the coupling element such that heat from the LED PCB is physically decoupled from heat from the LED driver PCB;

a transparent window extending across the first aperture;

a seal between a periphery of the transparent window and the housing for providing resistance to the entry of water into the hollow interior of the housing;

at least one LED mounted inside the first volume in a cavity formed by at least one exterior surface of the forward side of the housing and a rear side of the window; and a sealed servicing volume positioned aft of and separate and isolated from the first volume within the housing for remotely replacing an electrical connector, the sealed servicing volume being smaller in size than the first volume; and an internal seal for the sealed service volume comprising a printed circuit board (PCB) to mechanically isolate the sealed servicing volume from the first volume;

wherein the electrical connector is at least partially within the serviceable housing and extends through a second aperture in a rear side of the housing.

2. An underwater light, comprising:

A transparent window;

a lighting element comprising a plurality of light emitting diodes (LEDs) positioned adjacent the transparent window;

a driver circuit for driving the lighting element;

a housing to contain the lighting element, the housing including a first volume enclosing the lighting element and a serviceable second volume separate, water-sealed, and mechanically isolated from the first volume so as to prevent gas transfer therebetween, wherein the transparent window is positioned at a forward end of the housing, wherein the housing comprises thermally coupled forward and aft sections, wherein heat from an LED driver circuit is conducted through a coupling element into the aft section, while heat from an LED PCB is conducted into the forward section independently of the coupling element such that heat from the LED PCB is physically decoupled from heat from the LED driver PCB;

a user-serviceable removable rear connector mount assembly disposed partially in the serviceable second volume near an aft side of the housing and extending therefrom and configured to be user field serviceable;

a connector wiring area within the housing; and an electrical connector at least partially within the serviceable housing.

3. The light of claim 2, wherein the housing comprises a first diameter section, and a second diameter section having a reduced diameter relative to the first diameter section.

4. The light of claim 3, further comprising a mounting bracket coupled to the housing at the reduced diameter section.

5. The light of claim 4, wherein the mounting bracket is removably clamped to the housing at the reduced diameter section.

6. The light of claim 3, further comprising an internal water barrier between the lighting element and the connector wiring area.

7. The light of claim 6, wherein the internal water barrier comprises a PCB.

8. The light of claim 1, wherein the housing includes an aft housing cap partially enclosing the second volume.

9. The light of claim 8, further including an aft housing cap retainer seated about the aft housing cap.

10. The light of claim 8, wherein one or more O-rings seal the aft housing cap to the housing.

11. The light of claim 1, wherein the electrical connector is sealed with a connector O-ring.

12. The light of claim 8, wherein the electrical connector is threaded and is threaded into an opening in the aft housing cap.

13. The light of claim 1, further comprising a serviceable interconnect PCB.

14. The light of claim 2, further including an aft housing cap.

15. The light of claim 14, further including an aft housing cap retainer seated about the aft housing cap.

16. The light of claim 14, wherein one or more O-rings seal the aft housing cap to the housing.

17. The light of claim 2, wherein the electrical connector is sealed with a connector O-ring.

18. The light of claim 14, wherein the electrical connector is threaded and is threaded into an opening in the aft housing cap.

19. The light of claim 2, further comprising a serviceable interconnect PCB.

* * * * *